(12) United States Patent
Ackerman et al.

(10) Patent No.: US 10,089,356 B2
(45) Date of Patent: Oct. 2, 2018

(54) PROCESSING WINDOW PARTITIONING AND ORDERING FOR ON-LINE ANALYTICAL PROCESSING (OLAP) FUNCTIONS

(71) Applicant: International Business Machines Corporation, Armonk, NY (US)

(72) Inventors: William B. Ackerman, N. Billerica, MA (US); Eileen T. Lin, San Jose, CA (US); David L. Meyers, Shrewsbury, MA (US); Shivin S. Misra, Cambridge, MA (US); Michael R. Zabka, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 14/838,894

(22) Filed: Aug. 28, 2015

(65) Prior Publication Data
US 2017/0060953 A1   Mar. 2, 2017

(51) Int. Cl.
*G06F 17/30* (2006.01)

(52) U.S. Cl.
CPC .. *G06F 17/30486* (2013.01); *G06F 17/30377* (2013.01); *G06F 17/30477* (2013.01); *G06F 17/30592* (2013.01)

(58) Field of Classification Search
None
See application file for complete search history.

(56) References Cited

U.S. PATENT DOCUMENTS

| | | | | |
|---|---|---|---|---|
| 6,112,197 | A * | 8/2000 | Chatterjee | G06F 17/30595 |
| 6,289,335 | B1 * | 9/2001 | Downing | G06F 17/30309 |
| | | | | 707/769 |
| 7,809,712 | B2 | 10/2010 | Witkowski et al. | |
| 8,015,176 | B2 | 9/2011 | Colby et al. | |
| 8,676,821 | B2 | 3/2014 | Styles et al. | |
| 2013/0151567 | A1 * | 6/2013 | Ellison | G06F 17/30595 |
| | | | | 707/802 |

OTHER PUBLICATIONS

List of IBM Patents or Patent Applications Treated as Related, Total 2 pp., Sep. 14, 2016.
Preliminary Amendment, dated Sep. 14, 2016, for U.S. Appl. No. 15/265,366, filed Sep. 14, 2016 by W.B. Ackerman et al., Total 5 pp.

(Continued)

*Primary Examiner* — Anh Tai Tran
(74) *Attorney, Agent, or Firm* — Janaki K. Davda; Konrad, Raynes, Davda & Victor LLP

(57) ABSTRACT

Provided are techniques for processing window partitioning and ordering for OLAP functions. A prior compare operation is performed by: receiving an input vector for each of one or more attributes of input data that represent one of a partition-by column and an order-by column in a database query; generating a per-attribute comparison vector for each input vector; and producing a single output vector using each per-attribute comparison vector, wherein each value of the single output vector is a Boolean attribute whose value for a given tuple is true if a current value and a most recent prior value of any of the one or more attributes are different.

8 Claims, 16 Drawing Sheets

(56) References Cited

OTHER PUBLICATIONS

U.S. Appl. No. 15/265,366, filed Sep. 14, 2016, entitled, "Processing Window Partitioning and Ordering for On-Line Analytical Processing (OLAP) Functions", invented by W.B. Ackerman et al., Total 44 pp.

Preliminary Amendment, dated Apr. 19, 2018, for U.S. Appl. No. 15/265,366, filed Sep. 14, 2016 by W.B. Ackerman et al., Total 4 pp.

IBM; "Dynamic, Interactive Creation of OLAP Dimensions"; An IP.com Prior Art Database Technical Disclosure, Aug. 13, 2009, IP.com No. 000186229, retrieved at <URL: http://ip.com/IPCOM/000186229>, Total 8 pp.

ip.com, "Statistical Information Architecture on IFW and Structure of OLAP"; An IP.com Prior Art Database Technical Disclosure, Mar. 4, 2013, IP.com No. 000225754, retrieved at <URL: http://ip.com/IPCOM/000225754, Total 8 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Sep. 2011, Computer Security Division Information Technology Laboratory National Institute of Standards and Technology, Total 7 pp.

"OLAP Specification", [online], [Retrieved on Jul. 6, 2015]. Retrieved from the Internet at <URL: http://www-01.ibm.com/support/knowledgecenter/SSEPGG_10.5.0/com.ibm.db2.luw.sql.ref.doc/doc/r0023461.html?cp=SSEPGG_10.5.0%2F2-12-2-10-9&lang=en>, Total 9 pp.

\* cited by examiner

```
SELECT RANK() OVER (         order by c0,c1,c2,c3),
       RANK() OVER (partition by c0,c1      order by c2, c3),
       RANK() OVER (partition by c0,c1,c2  order by c3) FROM t1
```

| Without PC optimization | With PC optimization |
|---|---|
| 5 Prior Compare Function Calls<br>12 scans over input<br>2901 ms total time | 6 Prior Compare Function Calls<br>4 scans over input<br>1038 ms total time |
| order by c1,c2,c3,c4: 1024 ms<br>partition by c1,c2,c3: 698 ms<br>partition by c1,c2: 462 ms<br>order by c3, c4: 463 ms<br>order by c4: 235 ms | order by c1,c2,c3,c4: 7 ms<br>partition by c1,c2,c3: 7 ms<br>partition by c1,c2: 508 ms<br>order by c3, c4: 12 ms<br>order by c4: 253 ms<br>order by c3: 251 ms |

FIG. 10

PROCESSING WINDOW PARTITIONING AND ORDERING FOR ON-LINE ANALYTICAL PROCESSING (OLAP) FUNCTIONS

FIELD

Embodiments of the invention relate to processing window partitioning and ordering for On-line Analytical Processing (OLAP) functions, particularly in a columnar data engine.

BACKGROUND

On-Line Analytical Processing (OLAP) functions provide the ability to return ranking, row numbering, and aggregate function information as a scalar value in a query result.

An OLAP function specification may include optional window partitioning and optional window ordering. For example, the following illustrates window partitioning and ordering: RANK( ) OVER (PARTITION BY c0, c1 ORDER BY c2, c3). A window partitioning specifies how to split a result set into collections of rows for which the values of some set of columns or expressions are constant. It is a form of row grouping. A window ordering specifies the ordering of rows within a partition.

With existing Relational Database Management Systems (RDBMSs), a row-store engine processes such requests using row at a time processing, verifying on-the-fly whether this row is different from the previous row. That information may then be used to detect partition boundaries for window partitioning and ordering. There is limited reuse of information across window partitioning and ordering.

SUMMARY

Provided is a method for processing window partitioning and ordering for OLAP functions. The method comprises: performing a prior compare operation by: receiving an input vector for each of one or more attributes of input data that represent one of a partition-by column and an order-by column in a database query; generating a per-attribute comparison vector for each input vector; and producing a single output vector using each per-attribute comparison vector, wherein each value of the single output vector is a Boolean attribute whose value for a given tuple is true if a current value and a most recent prior value of any of the one or more attributes are different.

Provided is a computer program product processing window partitioning and ordering for OLAP functions. The computer program product comprises a computer readable storage medium having program code embodied therewith, the program code executable by at least one processor to perform: performing a prior compare operation by: receiving an input vector for each of one or more attributes of input data that represent one of a partition-by column and an order-by column in a database query; generating a per-attribute comparison vector for each input vector; and producing a single output vector using each per-attribute comparison vector, wherein each value of the single output vector is a Boolean attribute whose value for a given tuple is true if a current value and a most recent prior value of any of the one or more attributes are different.

Provided is a computer system processing window partitioning and ordering for OLAP functions. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: performing a prior compare operation by: receiving an input vector for each of one or more attributes of input data that represent one of a partition-by column and an order-by column in a database query; generating a per-attribute comparison vector for each input vector; and producing a single output vector using each per-attribute comparison vector, wherein each value of the single output vector is a Boolean attribute whose value for a given tuple is true if a current value and a most recent prior value of any of the one or more attributes are different.

BRIEF DESCRIPTION OF THE SEVERAL VIEWS OF THE DRAWINGS

Referring now to the drawings in which like reference numbers represent corresponding parts throughout:

FIG. 5 illustrates an example query with 3 RANK functions in accordance with certain embodiments.

FIG. 10 illustrates timing results specific to prior compare function in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
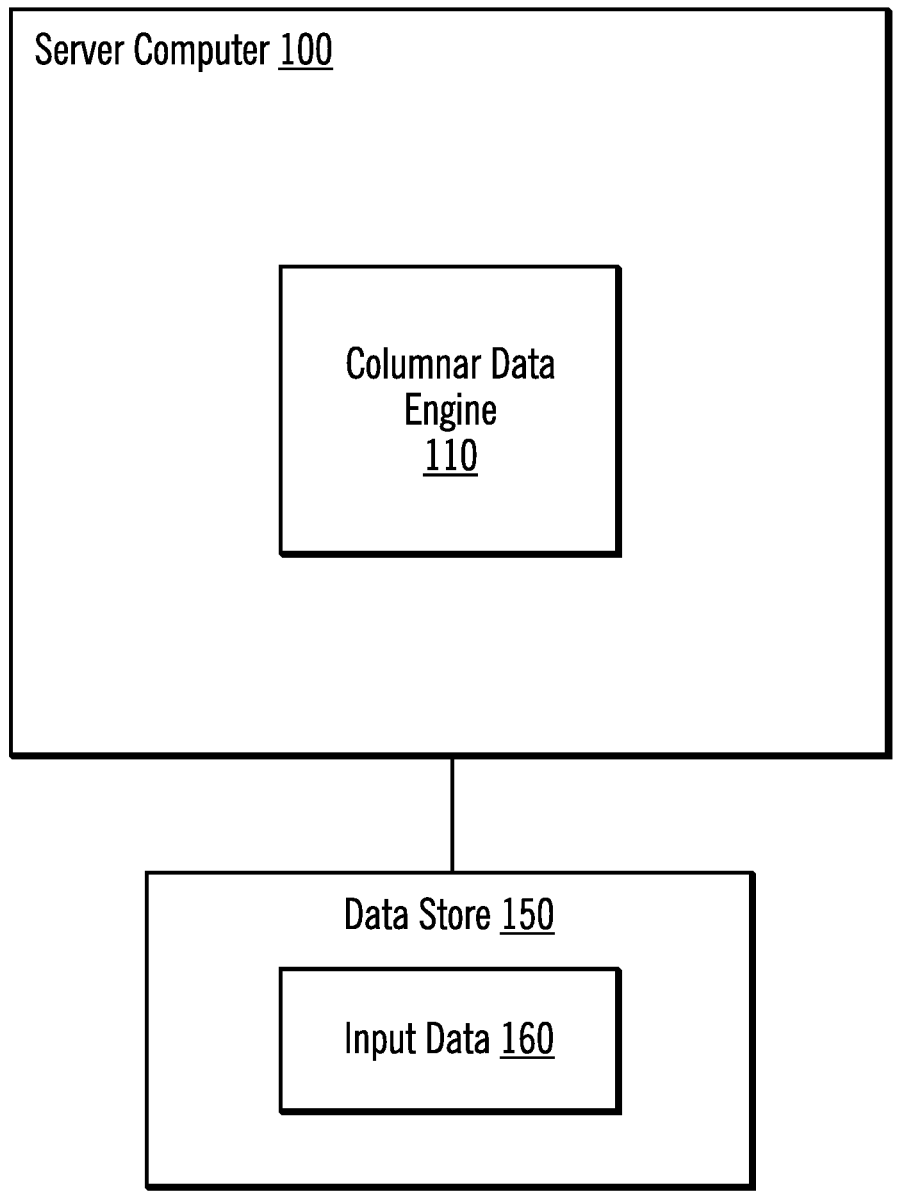
FIG. 1 illustrates, in a block diagram, a computing environment in accordance with certain embodiments.

FIG. 1 illustrates, in a block diagram, a computing environment in accordance with certain embodiments. In FIG. 1, a server computer 100 is coupled to a data store 150. The server computer 100 includes a columnar data engine 110. The data store 150 includes data 160.

With embodiments, the data 160 is input to an OLAP function and is ordered in a required ordering by a sort facility. That is, a common sort is required in such embodiments. The ordering enables the processing of both window partitioning and ordering within each OLAP function.

Figure 2:
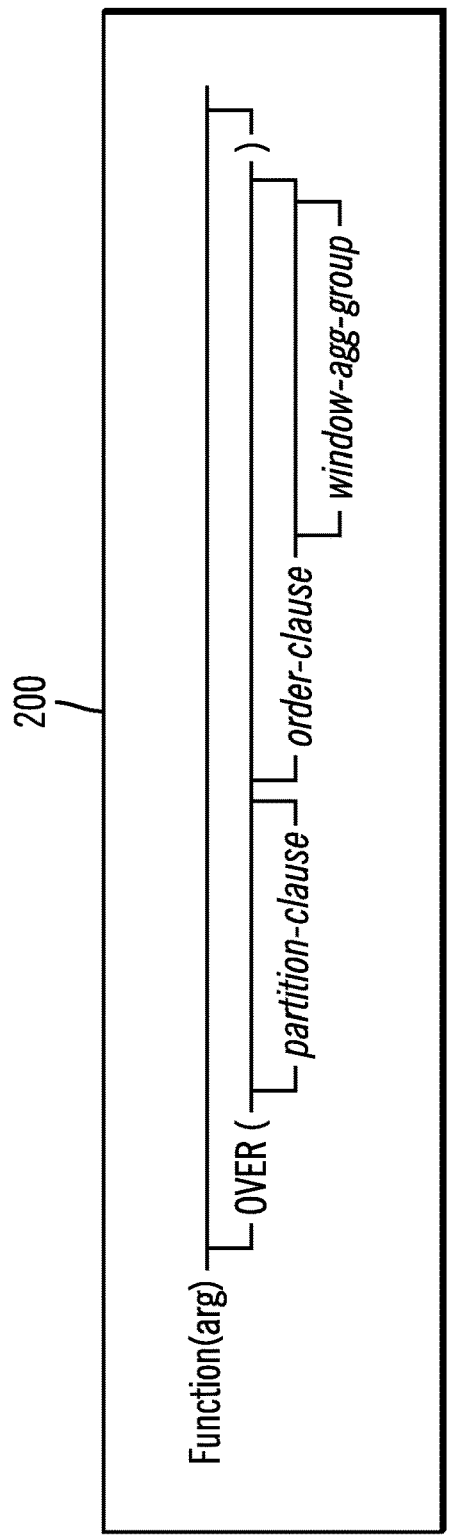
FIG. 2 illustrates an example OLAP function syntax 200 in accordance with certain embodiments.

FIG. 2 illustrates an example OLAP function syntax 200 in accordance with certain embodiments. In a relational DBMS, the OLAP function syntax 200 allows for window partitioning ("partition-clause") and window ordering ("order-clause"). The window and the partitions are specified separately. The window tells the OLAP function what rows to work on. The window-clause may be: "rows between unbounded preceding and current row" or "rows between 5 preceding and 5 following". That is, the window-clause picks a subset of the table on which the OLAP function will work on. The partitioning-clause will then break down the rows inside that window into smaller partitions. With the window partitioning, functions are applied to a set of rows within a "partition" (by default all rows within a window). With the window ordering, functions (such as RANK and DENSE_RANK) also compare two adjacent input rows to determine the output. Since both window partitioning and ordering perform comparisons between two adjacent input rows, the prior compare function is efficient for both of them.

In certain embodiments, the processing for window partitioning implies that each function detects partition boundaries (by comparisons of adjacent rows), since each OLAP function may have a different specification.

With embodiments, OLAP functions may require processing of window partitioning (e.g., to detect partition break) and window ordering (e.g., to determine whether the current value is equal to the prior row for RANK and DENSE_RANK functions).

Embodiments provide a new prior compare function. In certain embodiments, the processing for window ordering using prior compare may be for RANK and DENSE_RANK OLAP functions. The window partitioning and ordering examine the values in two adjacent input rows (to decide whether they are equal) in order to determine whether a current output value is to be incremented. Since comparison of adjacent input rows may involve scans over input, processing of window partitioning and ordering within each OLAP function may take up the major part of execution time of the OLAP function depending on the complexity of the OLAP function. Thus, embodiments provide this new prior compare function to efficiently process window partitioning and ordering.

With embodiments, the prior compare function produces a bit vector output that enables efficient processing of window partitioning and ordering in the columnar data engine.

With embodiments, the prior compare function takes as input one or more attributes, representing the partition-by or order-by columns. The prior compare function then produces as output a single Boolean attribute whose value for a given tuple is 'false' if the current and most recent prior values of all of its input attributes are identical, and 'true' if any are different. The 'null' value is considered equal to itself and different from any other values. In the columnar data engine, the prior compare function produces a vector of binary values. The prior compare function takes vectors of attribute values (each set of values corresponds to a specific row in the input data stream) and iterates through all values to produce the output vector.

In a columnar data engine, for example, the ROW_NUMBER OLAP function explicitly looks at the incoming PARTITION BY information (that is, the bit vector created from the prior compare function based on the PARTITION BY data). When that bit is seen to be on, it simply resets its counter. There is no need to examine the values on the PARTITION BY attribute list. Thus, the prior compare function provides an efficient technique for each OLAP function to process its window partitioning and ordering.

Since the prior compare function iterates through all values, its execution may take a non-trivial amount of time. If a query has multiple OLAP functions, each with different window partitioning and ordering specifications, the prior compare function may repeatedly compute the same intermediate prior compare outputs in order to construct the prior compare output for a different composite set of columns or expressions.

Thus, embodiments provide a prior compare optimization that may derive an efficient strategy to compute all prior compare outputs for a given query. Embodiments identify intersections, which are input attributes shared between two or more prior compares and, from these, embodiments identify building blocks, which may be described as a set of input attributes that do not need to be broken down into smaller intersections. The idea is to identify the prior compare building blocks, and reuse the existing prior compare outputs to construct any future prior compare requirements. By reusing the identified prior compare outputs as building blocks, new prior compare outputs may be constructed by an efficient vectorized OR operation.

Figure 3:
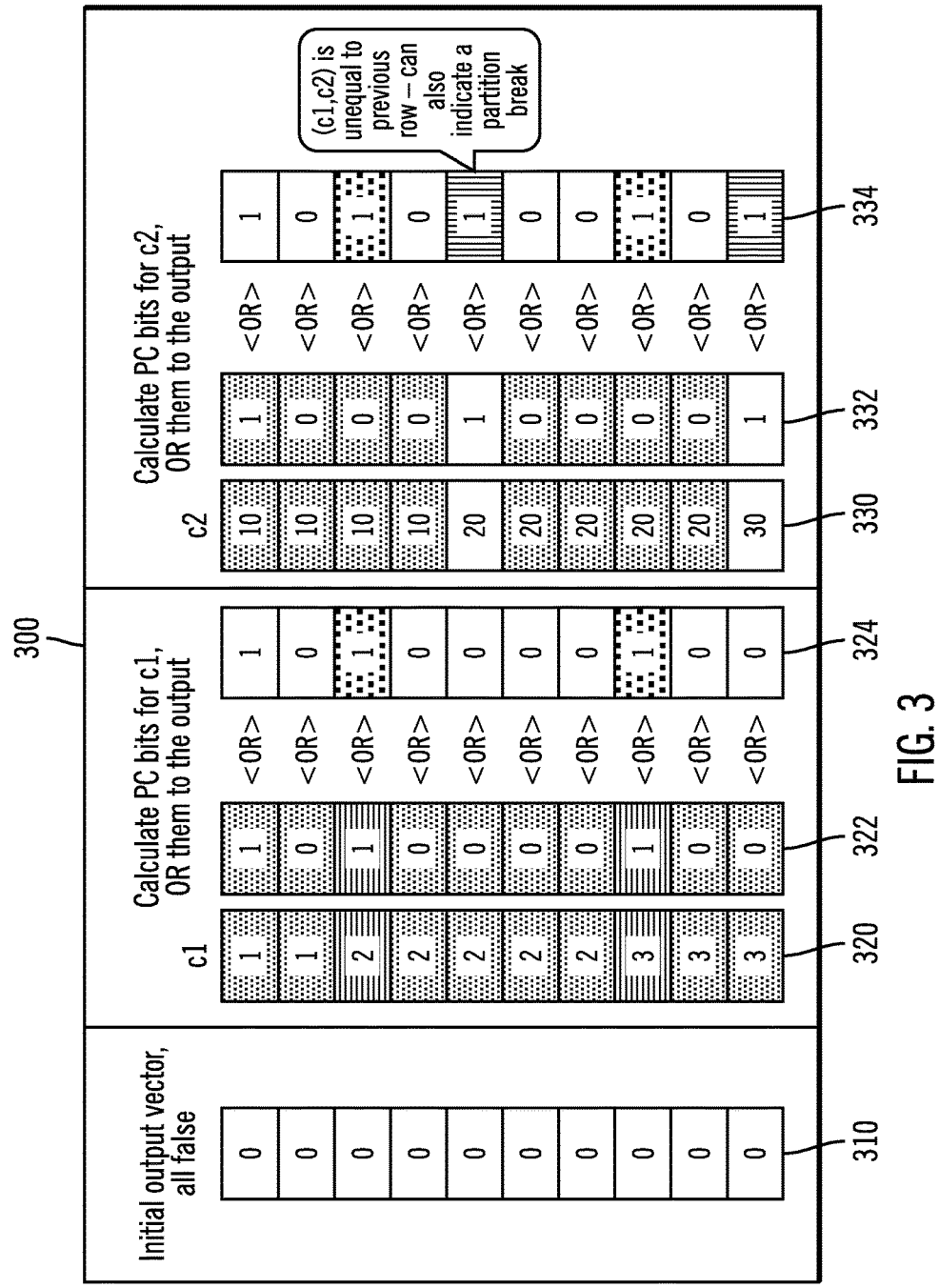
FIG. 3 illustrates how the prior compare function is used to compute the output for Prior Compare (c1,c2) in accordance with certain embodiments.

FIG. 3 illustrates an example 300 of how the prior compare function is used to compute the output for Prior Compare (c1,c2) in accordance with certain embodiments. That is, FIG. 3 depicts the computation of a prior compare over two attributes, c1 and c2. The vectors 310, 322, 324, 332, and 334 of FIG. 3 may be referred to as bit vectors. The vectors 320 and 330 of FIG. 3 may be referred to as input vectors (i.e., these are integer vectors).

Initially, all bits in the output vector 310 are set to FALSE (e.g., "0" in this example). The prior compare function now scans input vector 320 for the first input attribute, c1. Whenever the value is different from the value in the previous row, the corresponding bit in the per-attribute comparison vector 322 is set to TRUE (e.g., "1" in this example). Also, the first entry of the per-attribute comparison vector 322 is set to TRUE. So after scanning the input vector 320 for the first input attribute, c1, the per-attribute comparison vector 322 contains a TRUE for every row where the value in attribute c1 changes. For example, the third and eighth rows of the output vector are set to TRUE. Prior compare performs an OR operation between the output vector 310 and the per-attribute comparison vector 322 to generate intermediate result vector 324.

Next, prior compare compares the rows of the input vector 330 for the second input attribute, c2. Again, for every row that is different from the previous row, the corresponding bit in the per-attribute comparison vector 332 is set to TRUE. So, after scanning the input vector 330 for the second attribute, c2, the per-attribute comparison vector 332 contains a TRUE for every row where the value in attribute c2 changes. For example, the fifth and tenth rows of the per-attribute comparison vector 332 are set to TRUE. Prior compare performs an OR operation for intermediate result vector 324 and per-attribute comparison vector 332 to generate output vector 334. Now, looking at output vector 334, all TRUE values ("1" values) indicate a partition break.

With embodiments, if there were another attribute, c3, then, the output vector 334 may be used as an intermediate vector for an OR operation with a per-attribute comparison vector for attribute c3.

Thus, the columnar data engine 110 receives as input a vector for each of one or more attributes (e.g., attributes c1 and c2) of input data that represent one of a partition-by column and an order-by column in a database query. Then, the columnar data engine 110 produces as output a single vector (e.g., output vector 334), wherein each value of the vector is a Boolean attribute whose value for a given tuple is true if a current value and a most recent prior value of any of the one or more attributes are different. Such true values indicate a partition break. In particular, the columnar data engine 110 generates, for each attribute, an output vector (e.g., per-attribute comparison vector 322 for attribute c1 or per-attribute comparison vector 332 for attribute c2) which is OR'd with an initial vector (e.g., the initial output vector 310 is used for processing of the first attribute, c1) or an intermediate result vector of a previous attribute (e.g., the intermediate result vector 324 for attribute c1 is used in an OR operation with the per-attribute comparison vector 332 for the second or subsequent attribute, attribute c2). When all attributes are processed, the columnar data engine 110 outputs the single vector.

Figure 4:
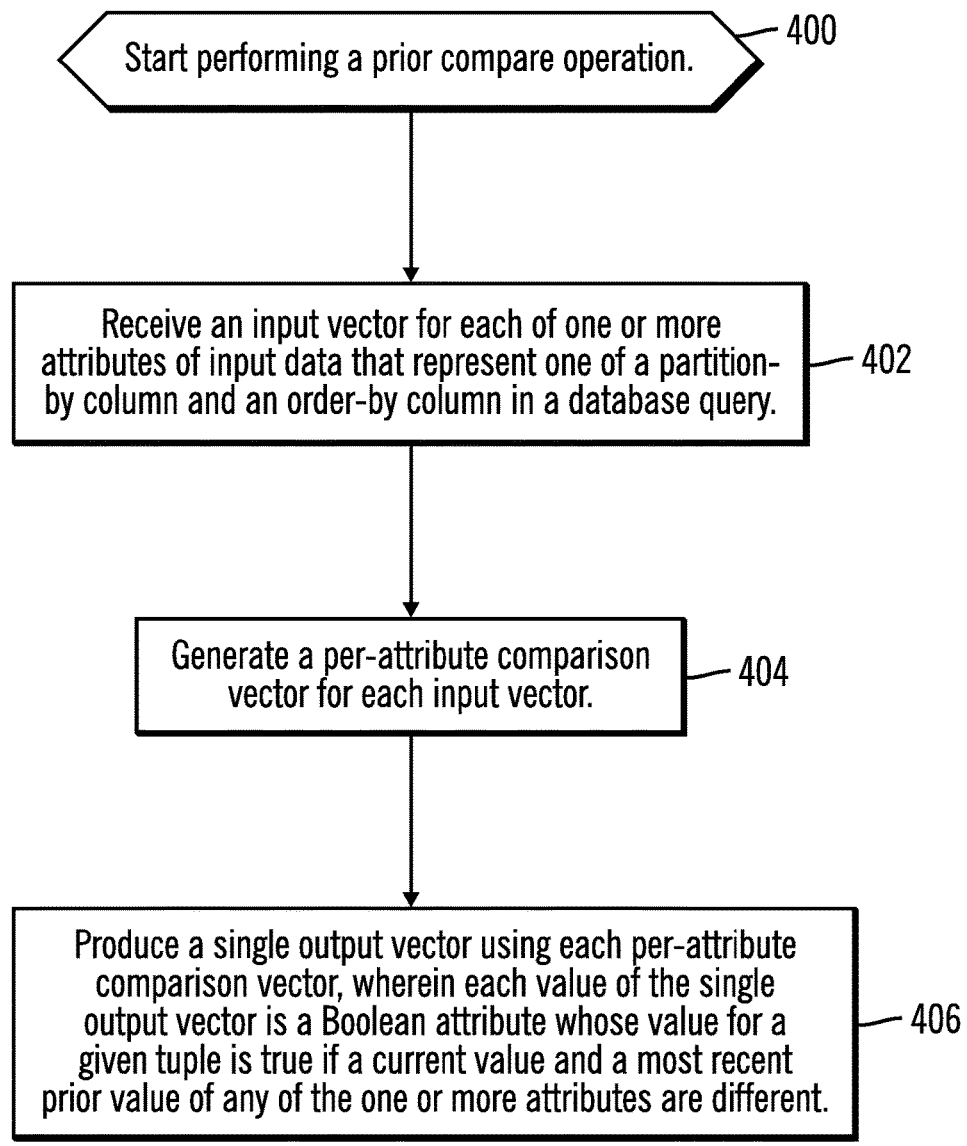
FIG. 4 illustrates, in a flowchart, operations for processing a prior compare function in accordance with certain embodiments.

FIG. 4 illustrates, in a flowchart, operations for processing a prior compare function in accordance with certain embodiments. Control begins at block 400, with the columnar data engine 110 starting to perform a prior compare operation. In block 402, the columnar data engine 110 receives an input vector for each of one or more attributes of input data that represent one of a partition-by column and an order-by column in a database query. In block 404, the columnar data engine 110 generates a per-attribute comparison vector for each input vector. In block 406, the columnar data engine 110 produces a single output vector using each per-attribute comparison vector, wherein each value of the single output vector is a Boolean attribute whose value for a given tuple is true if a current value and a most recent prior value of any of the one or more attributes are different.

FIG. 5 illustrates an example query 500 with 3 RANK functions in accordance with certain embodiments. For the example query 500, using prior compare, the following prior compare output is generated:

PC(c0, c1, c2, c3)—from order by
PC(c0, c1)—from partition by
PC(c2, c3)—from order by
PC(c0, c1, c2)—from partition by
PC(c3)—from order by Thus, without the prior compare optimization, c0, c1, c2 and c3 are each scanned 3 times, for a total of 12 scans over input.

Figure 6A:
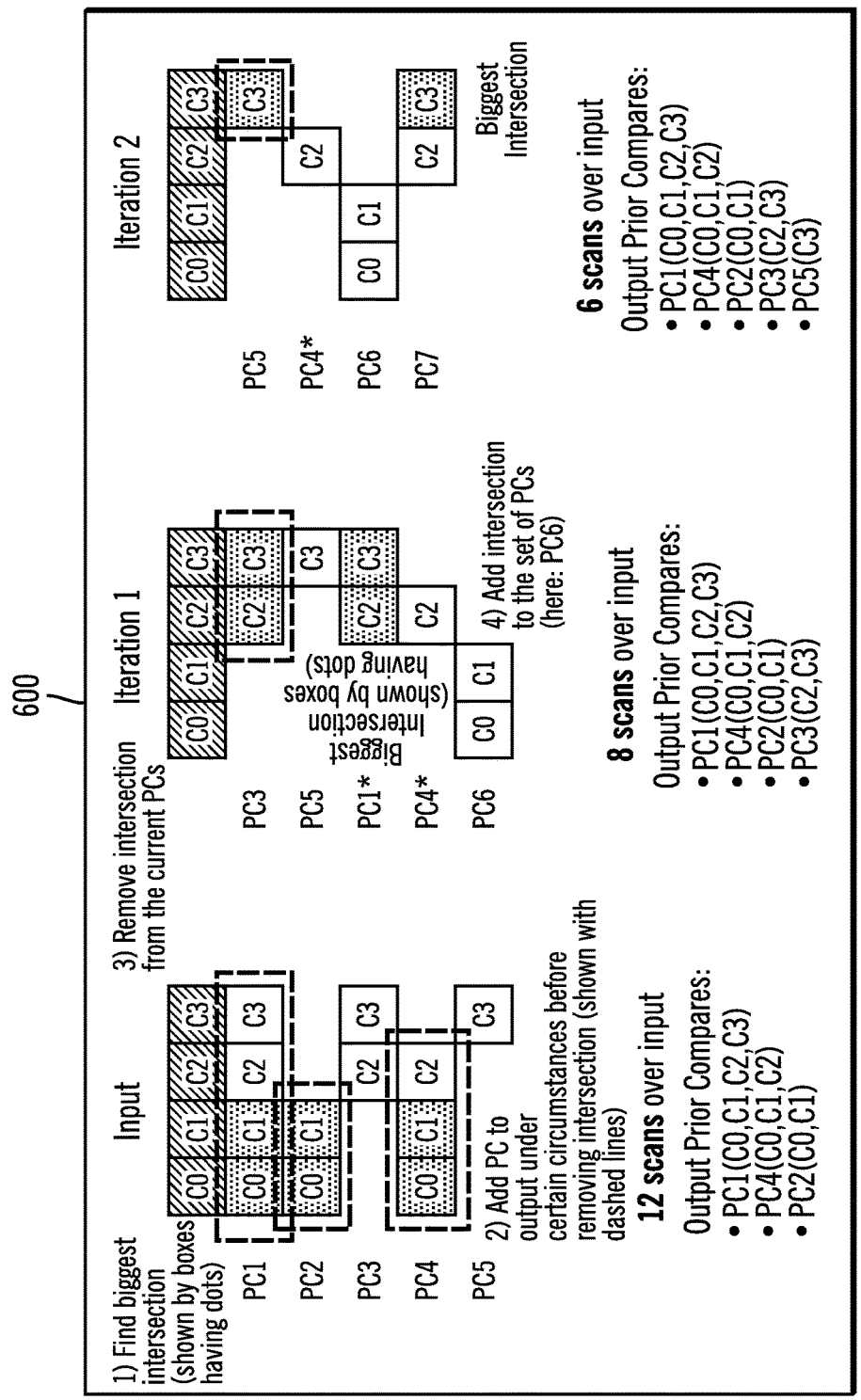
FIGS. 6A and 6B illustrates iterations performed to obtain prior compare building blocks for an example query in accordance with certain embodiments.
Figure 6B:
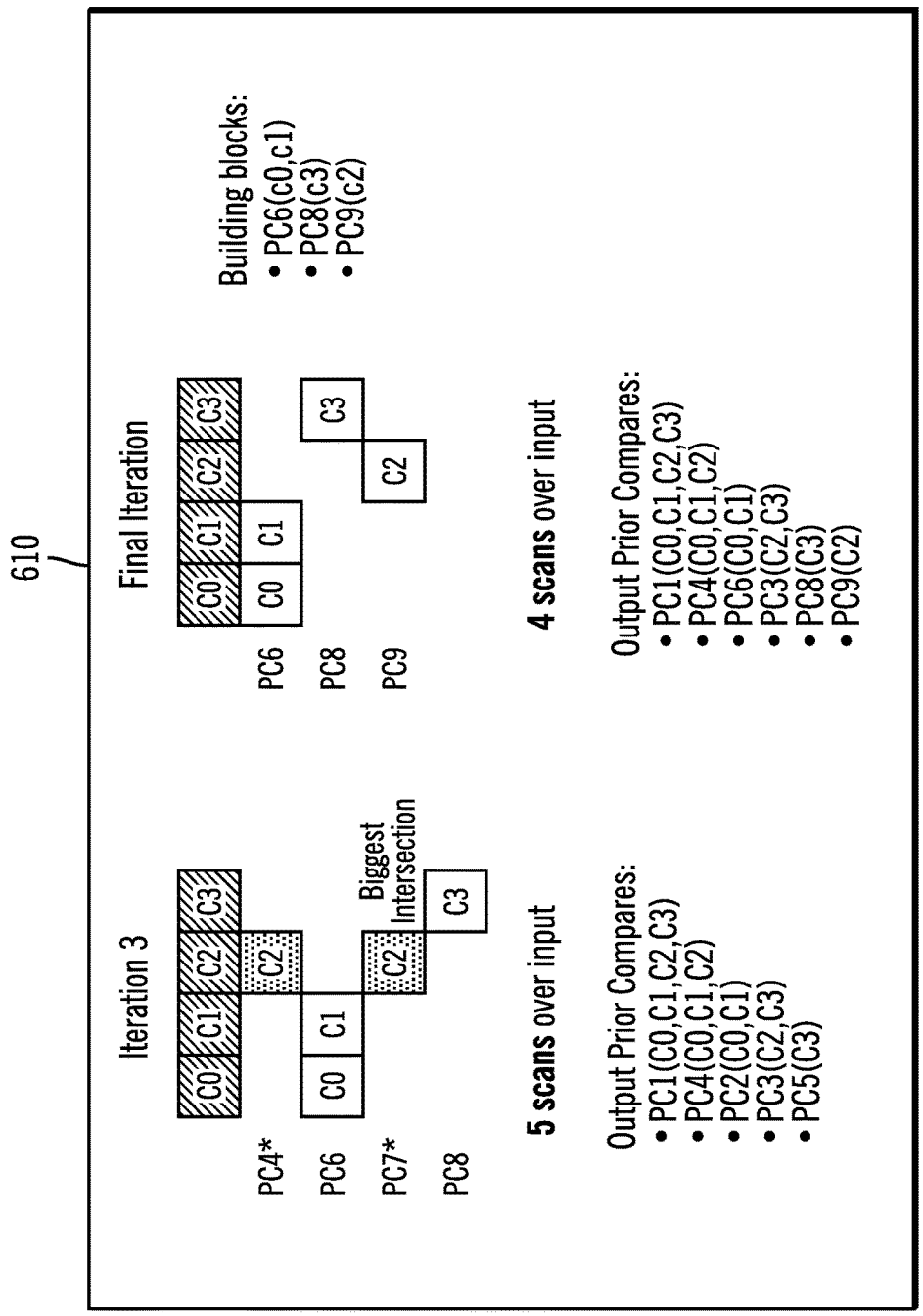
Figure 7:
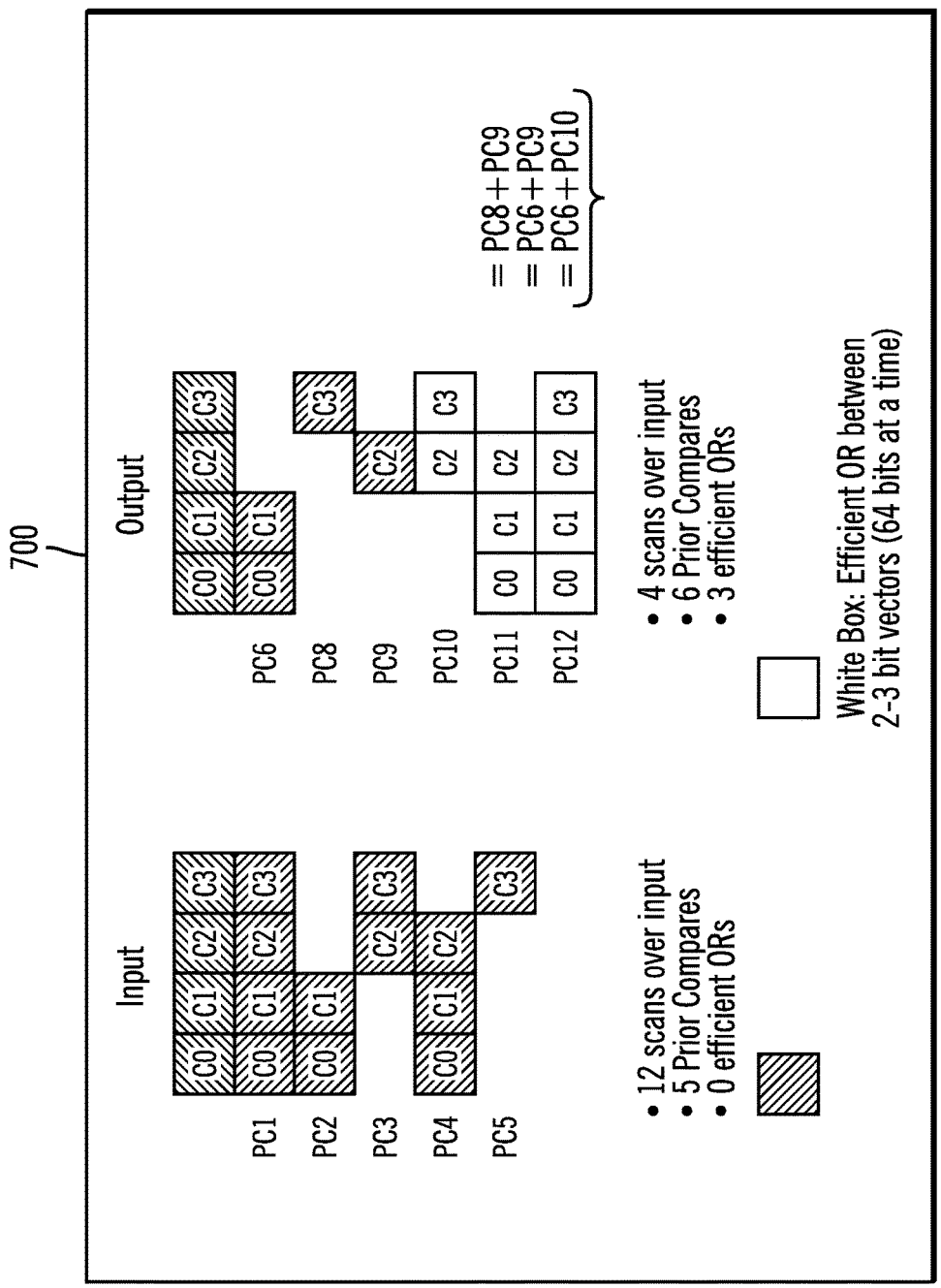
FIG. 7 illustrates input, output, and prior compare building blocks for prior compare optimization in accordance with certain embodiments.

FIGS. 6A, 6B, and 7 illustrate creation of prior compare building blocks for the example query 500. Prior compare is represented by "PC" in FIGS. 6A, 6B, and 7. For example query 500, 5 prior compare outputs (PC1-PC5) are needed. The partitioning and window ordering specifications for this query are represented by the following prior compares:

PC1: order by c0, c1, c2, c3
PC2: partition by c0, c1
PC3: order by c2, c3
PC4: partition by c0,c1,c2
PC5: order by c3

Each of the prior compares PC1-PC5 corresponds to a window partitioning or a window ordering specification.

With embodiments, existing prior compare output may be re-used if the specifications are identical. For example, one OLAP function may specify partition by c0, c1 and another may specify order by c0, c1. Both need prior compare (c0, c1), so embodiments produce one such output for both to use independently.

FIGS. 6A and 6B illustrates iterations 600, 610 performed to obtain prior compare building blocks for the example query 500 in accordance with certain embodiments. In the iterations 600, 610, the PCx* identifies a prior compare PCx from a previous iteration after the biggest intersection has been removed.

As demonstrated with FIGS. 6A and 6B, originally, there were the following prior compare outputs:

Prior Compare PC1 (c0,c1,c2,c3)
Prior Compare PC2 (c0,c1)
Prior Compare PC3 (c2,c3)
Prior Compare PC4 (c0,c1,c2)
Prior Compare PC5 (c3)

This set of prior compare outputs requires 12 scans over the input. However, the prior compare optimization identifies that the following are the prior compare building blocks:

Prior Compare PC6 (c0,c1)
Prior Compare PC8 (c3)
Prior Compare PC9 (c2)

FIG. 7 illustrates input, output, and prior compare building blocks 700 for prior compare optimization in accordance with certain embodiments. As shown in FIG. 7, the prior compare building blocks PC6, PC8, and PC9 may be used to construct the prior compares PC10 (c2, c3), PC11 (c0, c1, c2), and PC12 (c0, c1, c2, c3). An example construction strategy is demonstrated as PC10=PC8+PC9. PC10 stands for the Prior Compare (C2, C3), which may be composed by an efficient OR using PC8 (Prior Compare(C3)) and PC9 (Prior Compare (C2).

With reference to the example query 500, PC(c0) and PC(c1) were not generated. Instead, PC(c0,c1) was generated because it takes less execution time to compute PC(c0, c1) than to compute PC(c0), PC(c1) and then construct PC(c0,c1).

With embodiments, the scope of the prior compare optimization covers those OLAP functions that have compatible partitioning/ordering requirements such that one single sort orders the input data that satisfies these functions. For example, using the example query 500, all three RANK function references have compatible partitioning/ordering requirements with this global ordering of (c0, c1, c2, c3). These 3 RANK function specifications can thus have their Prior Compare requirements optimized together.

Figure 8A:
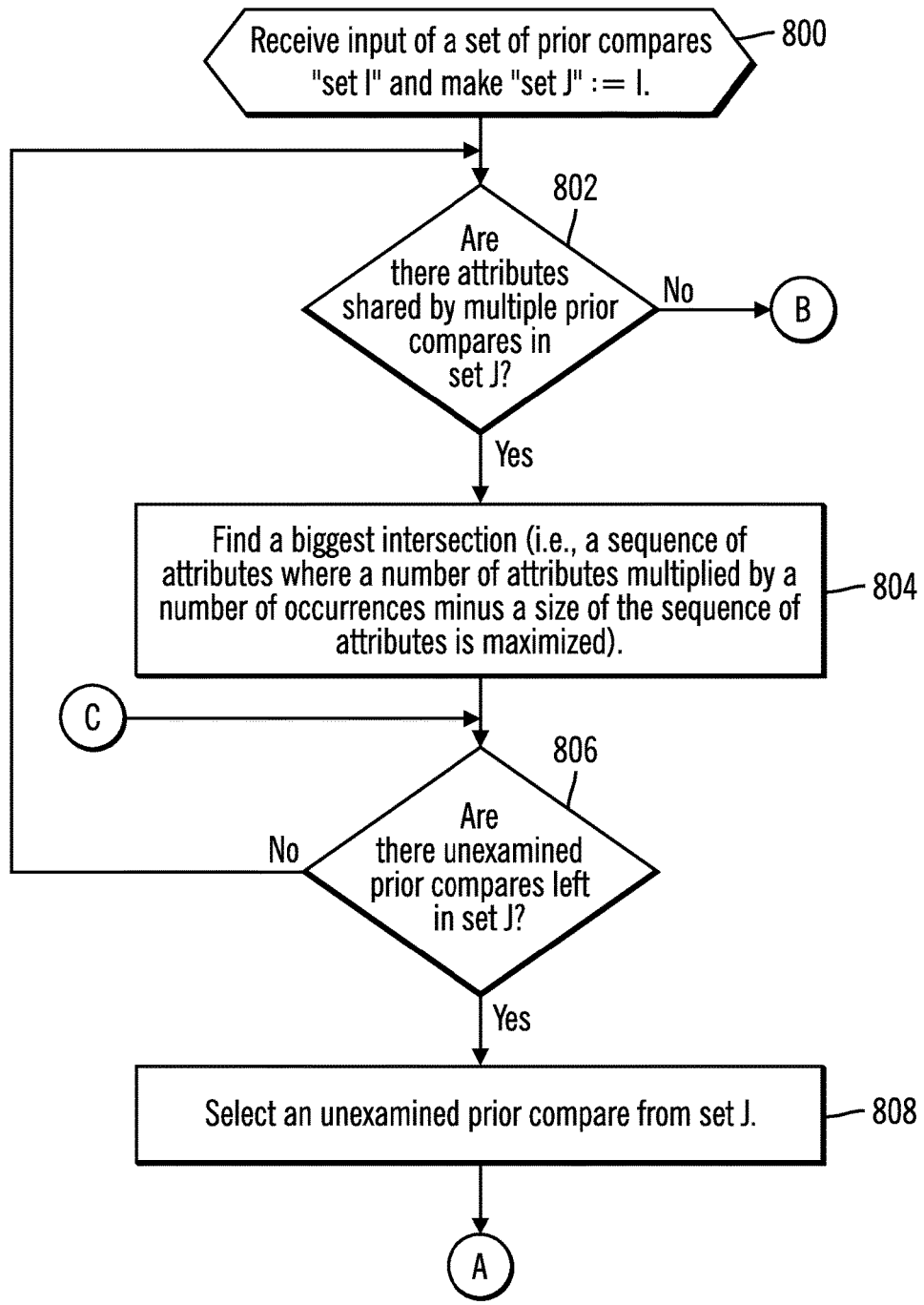
FIGS. 8A, 8B, and 8C illustrate, in a flowchart, operations for deriving a set of prior compare building blocks in accordance with certain embodiments.
Figure 8B:
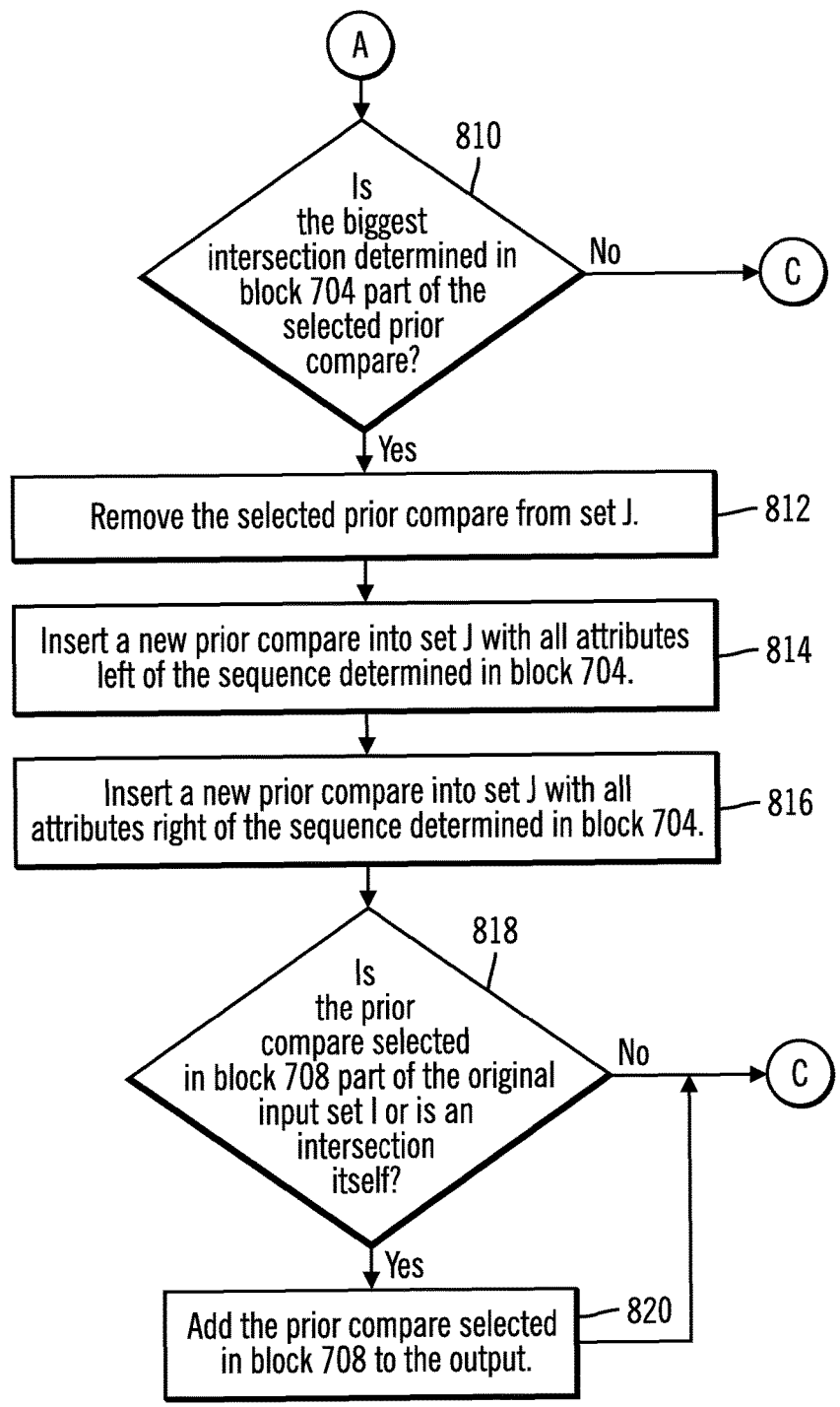
Figure 8C:
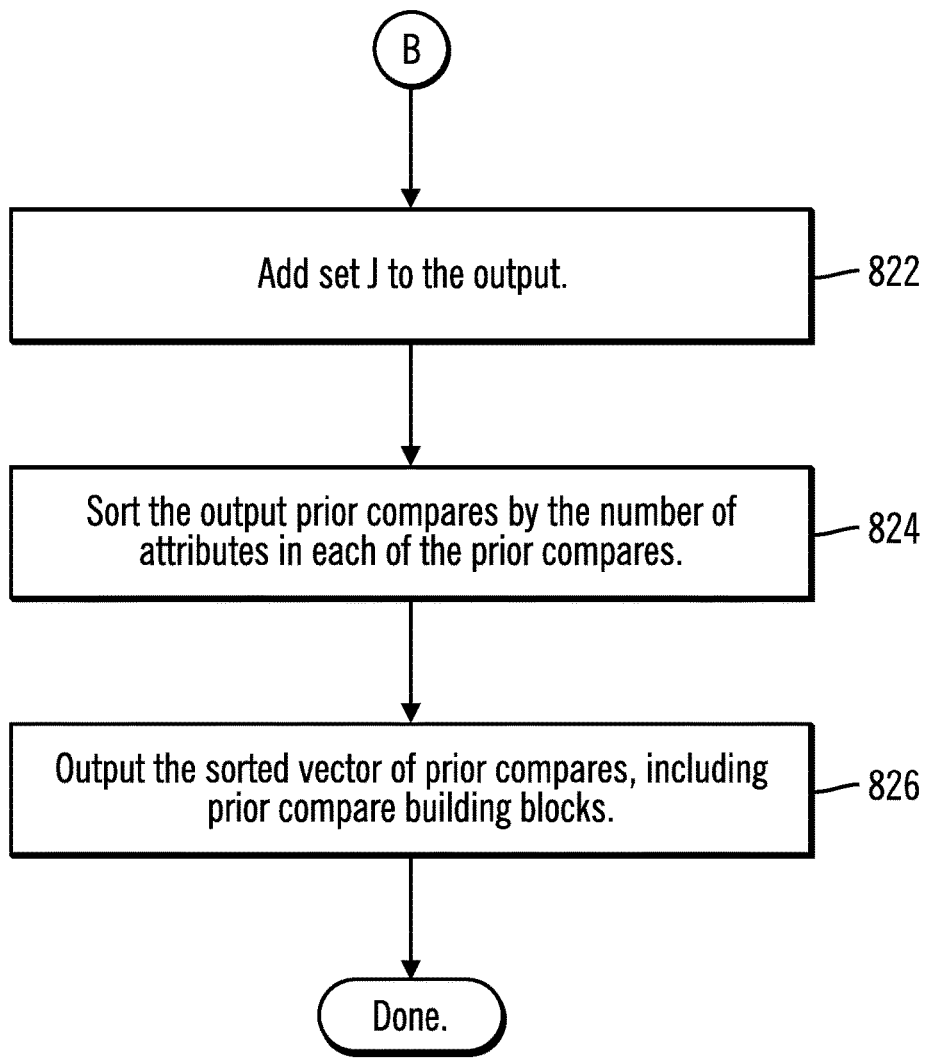

FIGS. 8A, 8B, and 8C illustrate, in a flowchart, operations for deriving a set of prior compare building blocks in accordance with certain embodiments. In particular, FIGS. 8A, 8B, and 8C illustrate operations for identifying the minimal set of Prior Compare building blocks with the minimal number of scans over input. Control begins at block 800 (FIG. 8A) with the columnar data engine 110 receiving input of a set of prior compares "set I" and making "set J":=I. In block 802, the columnar data engine 110 determines whether there are attributes shared by multiple prior compares in set J. If so, processing continues to block 804, otherwise, processing continues to block 822 (FIG. 8C). In block 804, the columnar data engine 110 finds a biggest intersection (i.e., a sequence of attributes where a number of attributes multiplied by a number of occurrences minus a size of the sequence of attributes is maximized). In block 806, the columnar data engine 110 determines whether there are unexamined prior compares left in set J. If so, processing continues to block 808, otherwise, processing loops back to block 802. In block 808, the columnar data engine 110 selects an unexamined prior compare from set J and processing continues to block 810 (FIG. 8B).

In block 810, the columnar data engine 110 determines whether the biggest intersection determined in block 804 is part of the selected prior compare. If so, processing continues to block 812, otherwise, processing continues to block 806 (FIG. 8A). In block 812, the columnar data engine 110 removes the selected prior compare from set J. In block 814, the columnar data engine 110 inserts a new prior compare into set J with all attributes left of the sequence determined in block 804. In block 816, the columnar data engine 110 inserts a new prior compare into set J with all the attributes right of the sequence determined in block 804.

In block 818, the columnar data engine 110 determines whether the prior compare selected in block 808 is part of the original input set I or is an intersection itself. If so, processing continues to block 820, otherwise, processing continues to block 806 (FIG. 8A). In block 820, the columnar data engine 110 adds the prior compare selected in block 808 to the output, and processing continues to block 806 (FIG. 8A). In particular, if one of the intermediate prior compares is not a subset of a bigger prior compare, and is not part of the original input, then is not going to be needed later on and is discarded at this stage of processing. If that intermediate prior compare is a subset of a bigger prior compare (but not the current biggest intersection), it will stay in the input set for now because it could be the next "biggest intersection".

In block 822, the columnar data engine 110 adds set J to the output. Certain embodiments do not distinguish between building blocks and intermediate prior compares (meaning prior compares that use building blocks as input, but whose output isn't directly required by the query; instead, they are only used as input to other prior compares). The items in "set J" may be considered building blocks. In block 824, the columnar data engine 110 sorts the output prior compares by the number of attributes in each of the prior compares. In block 826, the columnar data engine 110 outputs the sorted vector of prior compares, including prior compare building blocks.

Figure 9:
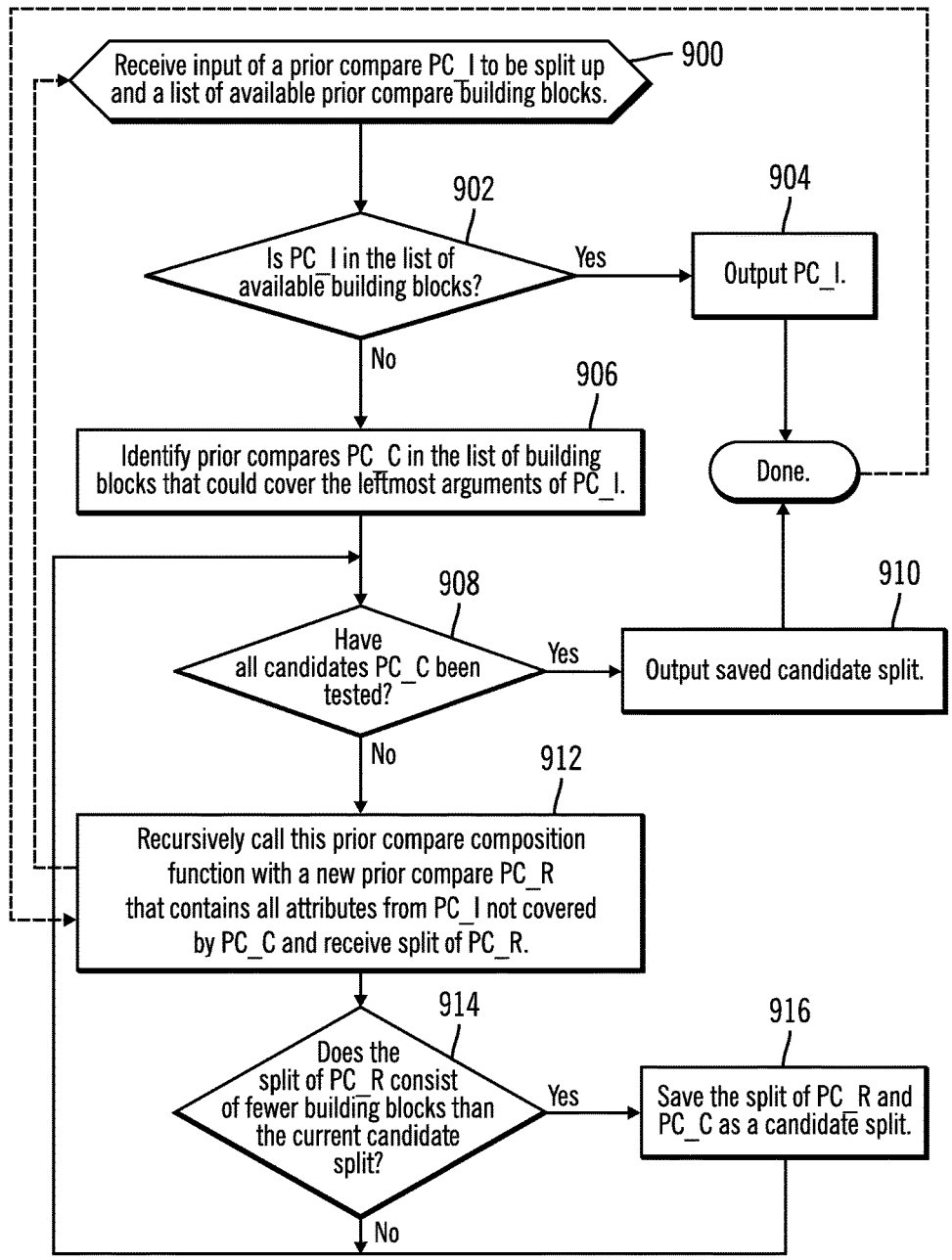
FIG. 9 illustrates in a flowchart, operations for determining what prior compare building blocks are composed of in accordance with certain embodiments.

FIG. 9 illustrates in a flowchart, operations for determining what prior compare building blocks are composed of in accordance with certain embodiments. The processing of FIG. 9 may be described as a prior compare composition function. The prior compare composition function determines what building blocks to use as input to compute a prior compare function. In particular, FIG. 9 generates an efficient strategy to compute the remaining prior compare functions using the building blocks. Control begins at block 900 with the columnar data engine 110 receiving input of a prior compare PC_I to be split up and a list of available prior compare building blocks. In block 902, the columnar data engine 110 determines whether PC_I is in the list of available building blocks. If so, processing continues to block 904, otherwise, processing continues to block 906. In block 904, the columnar data engine 110 outputs PC_I, and processing is done.

In block 906, the columnar data engine 110 identifies prior compares PC_C in the list of building blocks that could cover the leftmost arguments of PC_I. In block 908, the columnar data engine 110 determines whether all candidates PC_C have been tested. If so, processing continues to block 910, otherwise, processing continues to block 912. In block 910, the columnar data engine 110 outputs the saved candidate split, and processing ends.

In block 912, the columnar data engine 110 recursively calls this prior compare composition function with a new prior compare PC_R that contains all attributes from PC_I not covered by PC_C and receives the split of PC_R.

In block 914, the columnar data engine 110 determines whether the split of PC_R consists of fewer building blocks than the current candidate split. If so, processing continues to block 916, otherwise, processing loops back to block 908. In block 916, the columnar data engine 110 saves the split of PC_R and PC_C as a candidate split.

Thus, embodiments consist of two parts:
1) using the prior compare function to speed up the processing of window partitioning and ordering for OLAP functions in a columnar data processing engine; and
2) an optimization technique that may reduce the time spent on constructing the prior compare outputs for a query referencing multiple OLAP functions with different window partitioning and ordering specifications by identifying the basic prior compare building blocks. All other prior compare requirements may be constructed by an efficient vectorized OR operation using computed prior compare outputs. The optimization identifies the best construction strategy.

Embodiments produce a bit vector that enables efficient processing in the columnar data engine for window partitioning and ordering in OLAP functions. Embodiments allow maximal reuse of the information across window partitioning and ordering. With embodiments, OLAP functions, such as ROW_NUMBER, RANK and DENSE_RANK, do not need to examine input data and may completely compute the result using the outputs from prior compare functions. For other OLAP functions, the prior compare function may make window partitioning processing more efficient by quickly identifying which row is a partition break.

FIG. 10 illustrates timing results 1000 specific to prior compare function in accordance with certain embodiments. As illustrated on the left hand side, before the prior compare optimization, each prior compare reevaluates the prior compare for each column and then builds a composite. As illustrated on the right hand side where the prior compare computation is optimized, the prior compare building blocks (e.g. partition by c1,c2 (Prior Compare(c1,c2)), order by c3 (Prior Compare (c3)), order by c4 (Prior Compare (c4))) are the expensive operations. To evaluate prior compare (C3, C4), it now only takes 12 ms (compared with 462 ms without the optimization). The total time represents the total amount of time spent on constructing the needed prior compare outputs. With reference to in-house testing represented by the timing results 1000, the prior compares for the example query 500 took 2901 milliseconds. After the prior compare optimization, the prior compare execution time was reduced to 1038 milliseconds.

Embodiments use the more efficient vectorized OR-operation to calculate the output for two bit input vectors. The OR operation may be performed on the bits of the vectors (e.g., 64 bits for each vector) simultaneously. That is, embodiments cache the results of the comparisons in the form of a bit vector, and these are referred to as the prior compare building blocks, and these are the prior compares that scan the input. Then, embodiments re-use these prior compare building blocks to compute the results of other comparisons without actually doing any comparisons. That computation of results of comparisons based the prior compare (building blocks) uses the vectorized OR. Thus, with embodiments, the number of comparisons that are done is reduced. Also, embodiments compute the results of a comparison on a vector of values simultaneously.

Figure 11:
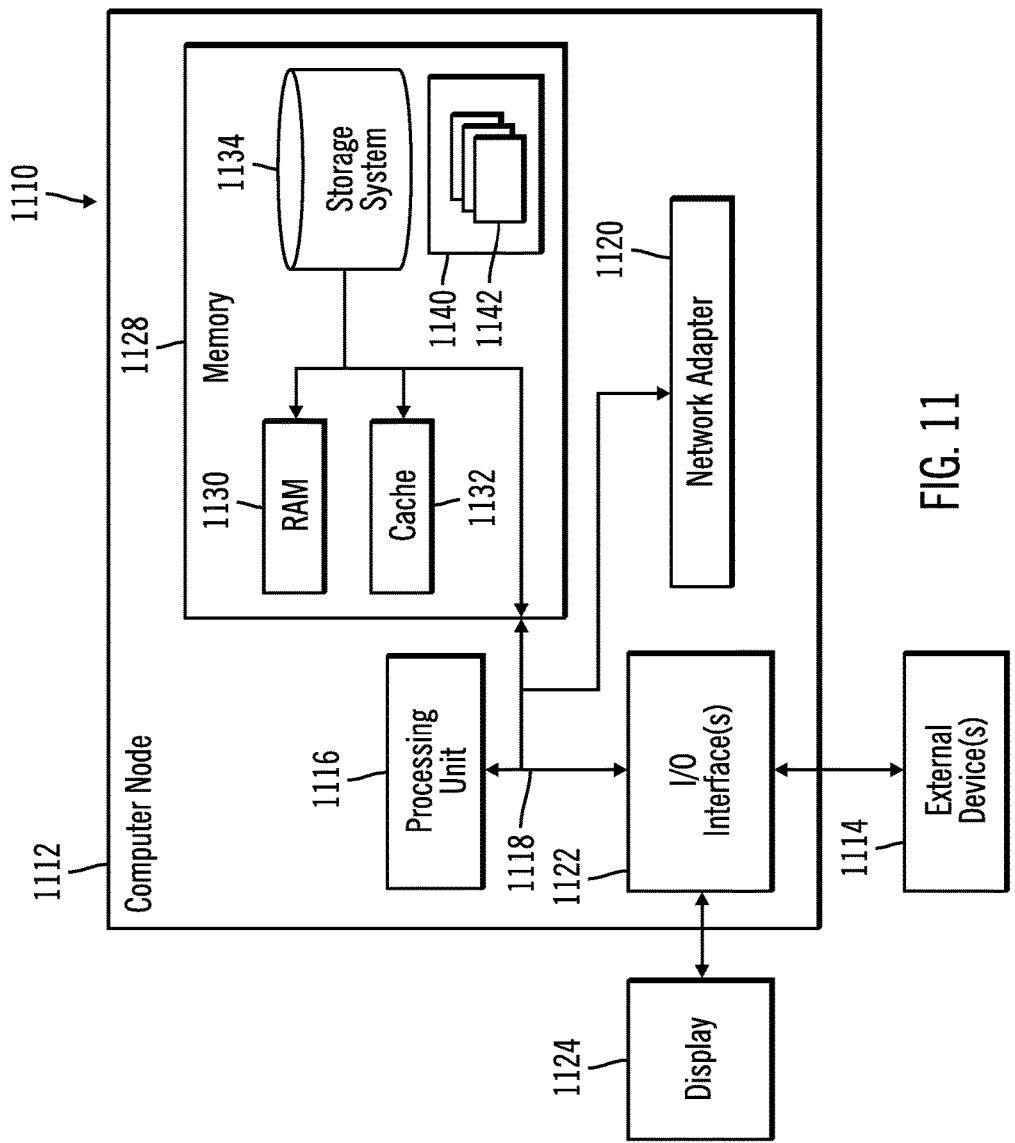
FIG. 11 illustrates a computing node in accordance with certain embodiments.

Referring now to FIG. 11, a schematic of an example of a cloud computing node is shown. Cloud computing node 1110 is only one example of a suitable cloud computing node and is not intended to suggest any limitation as to the scope of use or functionality of embodiments of the invention described herein. Regardless, cloud computing node 1110 is capable of being implemented and/or performing any of the functionality set forth hereinabove.

In cloud computing node 1110 there is a computer system/server 1112, which is operational with numerous other general purpose or special purpose computing system environments or configurations. Examples of well-known computing systems, environments, and/or configurations that may be suitable for use with computer system/server 1112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1112 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 1112 in cloud computing node 1110 is shown in the form of a general-purpose computing device. The components of computer system/server 1112 may include, but are not limited to, one or more processors or processing units 1116, a system memory 1128, and a bus 1118 that couples various system components including system memory 1128 to processor 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1112 typically includes a variety of computer system readable media. Such media may be any available media that is accessible by computer system/server 1112, and it includes both volatile and non-volatile media, removable and non-removable media.

System memory 1128 can include computer system readable media in the form of volatile memory, such as random access memory (RAM) 1130 and/or cache memory 1132. Computer system/server 1112 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1118 by one or more data media interfaces. As will be further depicted and described below, memory 1128 may include at least one program product having a set (e.g., at least one) of program modules that are configured to carry out the functions of embodiments of the invention.

Program/utility 1140, having a set (at least one) of program modules 1142, may be stored in memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein.

Computer system/server 1112 may also communicate with one or more external devices 1114 such as a keyboard, a pointing device, a display 1124, etc.; one or more devices that enable a user to interact with computer system/server 1112; and/or any devices (e.g., network card, modem, etc.) that enable computer system/server 1112 to communicate with one or more other computing devices. Such communication can occur via Input/Output (I/O) interfaces 1122. Still yet, computer system/server 1112 can communicate with one or more networks such as a local area network (LAN), a general wide area network (WAN), and/or a public network (e.g., the Internet) via network adapter 1120. As depicted, network adapter 1120 communicates with the other components of computer system/server 1112 via bus 1118. It should be understood that although not shown, other hardware and/or software components could be used in conjunction with computer system/server 1112. Examples, include, but are not limited to: microcode, device drivers, redundant processing units, external disk drive arrays, RAID systems, tape drives, and data archival storage systems, etc.

In certain embodiments, the server computer 100 has the architecture of computing node 1110. In certain embodiments, the server computer 100 is part of a cloud environment. In certain alternative embodiments, the server computer 100 is not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
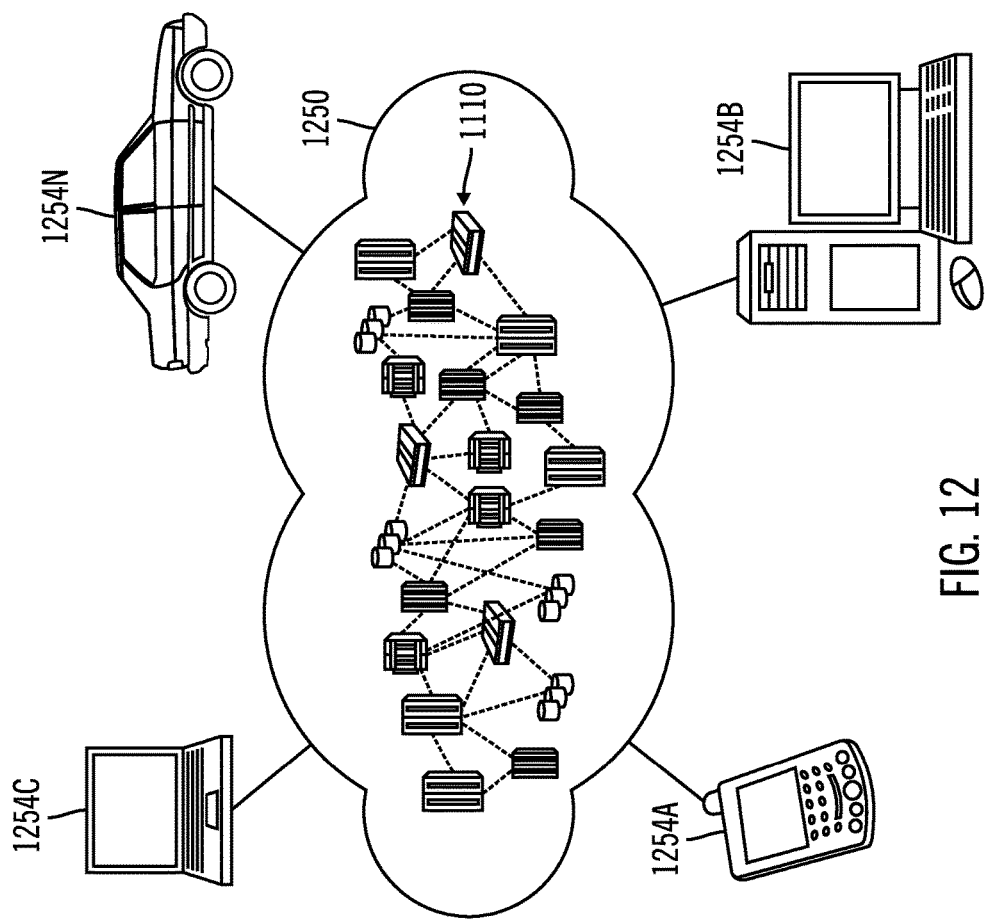
FIG. 12 illustrates a cloud computing environment with certain embodiments.

Referring now to FIG. 12, illustrative cloud computing environment 1250 is depicted. As shown, cloud computing environment 1250 comprises one or more cloud computing nodes 1110 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1110 and cloud computing environment 1250 can communicate with any type of computerized device over any type of network and/or network addressable connection (e.g., using a web browser).

Figure 13:
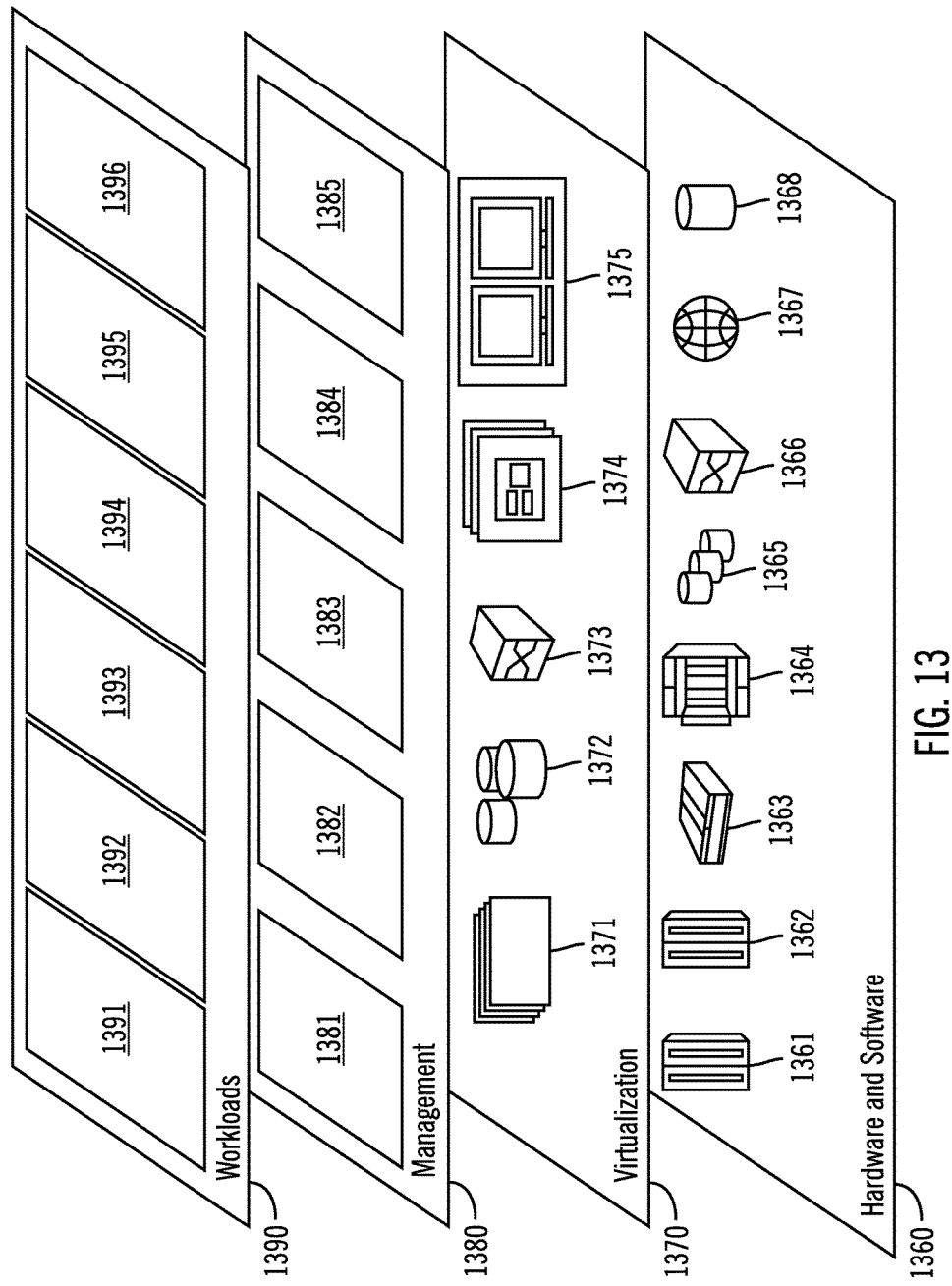
FIG. 13 illustrates abstraction model layers with certain embodiments.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and prior compare processing 1396.

Thus, in certain embodiments, software or a program, implementing prior compare processing in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor to perform:
performing a prior compare operation by:
receiving an input vector for each of one or more attributes of input data that represent one of a partition-by column and an order-by column in a database query;
generating a per-attribute comparison vector for each input vector; and
producing a single output vector using each per-attribute comparison vector, wherein each value of the single output vector is a Boolean attribute whose value for a given tuple is true if a current value and a most recent prior value of any of the one or more attributes are different; and
in response to receiving a second database query with multiple On-line Analytical Processing (OLAP) functions that each have different partitioning and ordering specifications and that share a sort,
identifying a minimal set of prior compare building blocks with a minimal number of scans over the input data for use by the multiple OLAP functions; and
computing remaining prior compare functions using the minimal set of the prior compare building blocks.

2. The computer program product of claim 1, wherein the prior compare operation is used to 1) identify a beginning of a new partition and 2) determine whether values of the one or more attributes have changed.

3. The computer program product of claim 1, wherein each value of the single output vector is a Boolean attribute whose value for a given tuple is false if the current value and the most recent prior value of all of the one or more attributes are identical.

4. The computer program product of claim 1, wherein a Software as a Service (SaaS) is configured to perform computer program product operations.

5. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform:
performing a prior compare operation by:
receiving an input vector for each of one or more attributes of input data that represent one of a partition-by column and an order-by column in a database query;
generating a per-attribute comparison vector for each input vector; and
producing a single output vector using each per-attribute comparison vector, wherein each value of the single output vector is a Boolean attribute whose value for a given tuple is true if a current value and a most recent prior value of any of the one or more attributes are different; and
in response to receiving a second database query with multiple On-line Analytical Processing (OLAP) functions that each have different partitioning and ordering specifications and that share a sort,
identifying a minimal set of prior compare building blocks with a minimal number of scans over the input data for use by the multiple OLAP functions; and
computing remaining prior compare functions using the minimal set of the prior compare building blocks.

6. The computer system of claim 5, wherein the prior compare operation is used to 1) identify a beginning of a new partition and 2) determine whether values of the one or more attributes have changed.

7. The computer system of claim 5, wherein each value of the single output vector is a Boolean attribute whose value for a given tuple is false if the current value and the most recent prior value of all of the one or more attributes are identical.

8. The computer system of claim 5, wherein a Software as a Service (SaaS) is configured to perform system operations.

* * * * *